(12) United States Patent
Kimoto et al.

(10) Patent No.: US 8,619,193 B2
(45) Date of Patent: Dec. 31, 2013

(54) COMMUNICATION APPARATUS, CONTROL METHOD, AND COMPUTER READABLE RECORDING MEDIUM

(75) Inventors: Tatsuya Kimoto, Tokyo (JP); Isao Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 12/890,556

(22) Filed: Sep. 24, 2010

(65) Prior Publication Data

US 2011/0080485 A1   Apr. 7, 2011

(30) Foreign Application Priority Data

Oct. 2, 2009   (JP) ................................. 2009-230647

(51) Int. Cl.
*H04N 7/00*       (2011.01)
*H04N 11/00*    (2006.01)
*H04N 7/18*       (2006.01)

(52) U.S. Cl.
USPC ........................................... 348/552; 725/80

(58) Field of Classification Search
None
See application file for complete search history.

(56) References Cited

U.S. PATENT DOCUMENTS

| | | | |
|---|---|---|---|
| 7,949,762 B2 | 5/2011 | Takatsuji | |
| 8,037,342 B2 | 10/2011 | Kimoto | |
| 2009/0157885 A1* | 6/2009 | Takatsuji et al. | 709/228 |
| 2009/0160868 A1* | 6/2009 | Yato | 345/531 |
| 2009/0207307 A1* | 8/2009 | Tsuru et al. | 348/554 |
| 2009/0237561 A1* | 9/2009 | Kobayashi | 348/554 |
| 2010/0017645 A1 | 1/2010 | Kimoto | |
| 2010/0020183 A1 | 1/2010 | Kimoto | |
| 2010/0165198 A1 | 7/2010 | Abe | |
| 2011/0038595 A1 | 2/2011 | Kimoto | |
| 2011/0047586 A1 | 2/2011 | Koizumi | |

FOREIGN PATENT DOCUMENTS

| | | |
|---|---|---|
| JP | 2007-202115 A | 8/2007 |
| JP | 2007-267080 A | 10/2007 |
| JP | 2009-071729 A | 4/2009 |
| JP | 2009-077347 A | 4/2009 |

\* cited by examiner

*Primary Examiner* — Jason J Chung
*Assistant Examiner* — William J Kim
(74) *Attorney, Agent, or Firm* — Canon USA, Inc., IP Division

(57) ABSTRACT

A communication apparatus includes a communication unit, a first determination unit, a second determination unit, and a control unit. The communication unit communicates with an external apparatus via communication lines that conform to HDMI standard. The first determination unit determines whether the first data indicating that the external apparatus displays video data transmitted from the communication unit to the external apparatus is detected by the communication unit has received via a CEC line. The second determination unit determines whether a second data indicating that the external apparatus displays video data transmitted from the communication unit to the external apparatus is detected by the communication via a TMDS line. The control unit determines whether to transmit video data to the external apparatus based on at least one of a determination result obtained by the first determination unit and a determination result obtained by the second determination unit.

19 Claims, 3 Drawing Sheets

COMMUNICATION APPARATUS, CONTROL METHOD, AND COMPUTER READABLE RECORDING MEDIUM

CROSS REFERENCE TO RELATED APPLICATIONS

This application claims priority from Japanese Patent Application No. 2009-230647 filed Oct. 2, 2009, which is hereby incorporated by reference herein in its entirety.

BACKGROUND OF THE INVENTION

1. Field of the Invention

The present invention relates to a communication apparatus that can communicate with an external apparatus, and further relates to a relevant control method and a computer-readable recording medium.

2. Description of the Related Art

There are many communication systems that are operable in conformity with High Definition Multimedia Interface (HDMI®) standard (hereinafter, referred to as "HDMI systems"). Each HDMI system includes a source device and a sink device. The source device transmits video data and audio data. The sink device includes a display device that is capable of displaying video data received from the source device.

The HDMI system enables each user to view desired video data on the display device of the sink device that can display video data reproduced from the source device.

Recently, control commands are usable to control a source device and a sink device that are present in an HDMI system. For example, a control command for the source device is usable to control the sink device. Similarly, a control command for the sink device is usable to control the source device.

If in the above-described HDMI system a user performs an operation instructing the source device to reproduce video data, the source device transmits a power control command to the sink device while reproducing the video data, so that a power source of the sink device can be activated to display the reproduced video data on the sink device.

As discussed in Japanese Patent Application Laid-Open No. 2007-202115, if the power source of the sink device is in an off state at the time when the power control command has been received from the source device, the sink device changes a state of the power source to an on state from the off state.

The above-described source device, if transmission of the power control command to the sink device is completed, transmits the reproduced video data to the sink device. If the sink device is in a state where the video data received from the source device is displayable, the sink device displays the video data received from the source device.

However, according to the above-described conventional system, even in a case where the sink device cannot receive any control command from the source device, the source device transmits the power control command to the sink device unconditionally in response to the operation instructing the source device to reproduce video data and then transmits the reproduced video data to the sink device.

Further, in a case where the sink device cannot be controlled based on the power control command received from the source device or in a case where the sink device cannot display any video data received from the source device, the source device repeats the above-described operation for transmitting the reproduced video data to the sink device.

As described above, the source device may continue the process for transmitting the video data to the sink device regardless of the state of the sink device. In such a case, a user who intends to view video data reproduced by the source device on the sink device may miss the opportunity to view a desired part of the reproduced video data.

SUMMARY OF THE INVENTION

The present invention is directed to a technique capable of controlling a source device to transmit video data according to a state of a sink device.

According to an aspect of the present invention, a communication apparatus includes a communication unit, a first determination unit, a second determination unit, and a control unit. The communication unit communicates with an external apparatus via communication lines that conform to High Definition Multimedia Interface (HDMI) standard. The first determination unit determines whether a first data is detected by the communication unit via a Consumer Electronics Control (CEC) line. The first data includes data indicating that the external apparatus displays video data transmitted from the communication unit to the external apparatus. The second determination unit determines whether a second data is detected by the communication unit via a Transition Minimized Differential Signaling (TMDS) line. The second data includes data indicating that the external apparatus displays video data transmitted from the communication unit to the external apparatus. The control unit determines whether to transmit the video data from the communication unit to the external apparatus via the TMDS line based on at least one of a determination result obtained by the first determination unit and a determination result obtained by the second determination unit.

According to another aspect of the present invention, there is provided a method of controlling a communication apparatus that includes a communication unit, a first determination unit, a second determination unit, and a control unit. The communication unit communicates with an external apparatus via communication lines that conform to High Definition Multimedia Interface (HDMI) standard. The first determination unit determines whether a first data is detected by the communication unit via a Consumer Electronics Control (CEC) line. The first data includes data indicating that the external apparatus displays video data transmitted from the communication unit to the external apparatus. The second determination unit determines whether a second data is detected by the communication unit via a Transition Minimized Differential Signaling (TMDS) line. The second data includes data indicating that the external apparatus displays video data transmitted from the communication unit to the external apparatus. Regarding the method, the method includes determining whether to transmit the video data from the communication unit to the external apparatus via the TMDS line based on at least one of a determination result obtained by the first determination unit and a determination result obtained by the second determination unit.

According to yet another aspect of the present invention, there is provided a computer-readable recording medium storing a program executed by a computer, wherein the program is for using the computer to perform a method of controlling a communication apparatus that includes a communication unit, a first determination unit, a second determination unit, and a control unit. The communication unit communicates with an external apparatus via communication lines that conform to High Definition Multimedia Interface (HDMI) standard. The first determination unit determines whether a first data is detected by the communication unit via a Consumer Electronics Control (CEC) line.

The first data includes data indicating that the external apparatus displays video data transmitted from the communication unit to the external apparatus. The second determination unit determines whether a second data is detected by the communication unit via a Transition Minimized Differential Signaling (TMDS) line. The second data includes data indicating that the external apparatus displays video data transmitted from the communication unit to the external apparatus. Regarding the method, the method includes determining whether to transmit the video data from the communication unit to the external apparatus via the TMDS line based on at least one of a determination result obtained by the first determination unit and a determination result obtained by the second determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DESCRIPTION OF THE EMBODIMENTS

Figure 1:
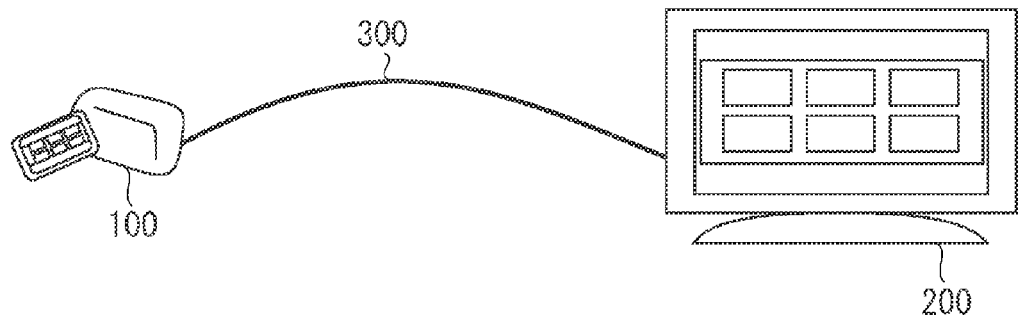
FIG. 1 is a system configuration diagram illustrating a communication system according to an exemplary embodiment of the present invention.
Figure 2:
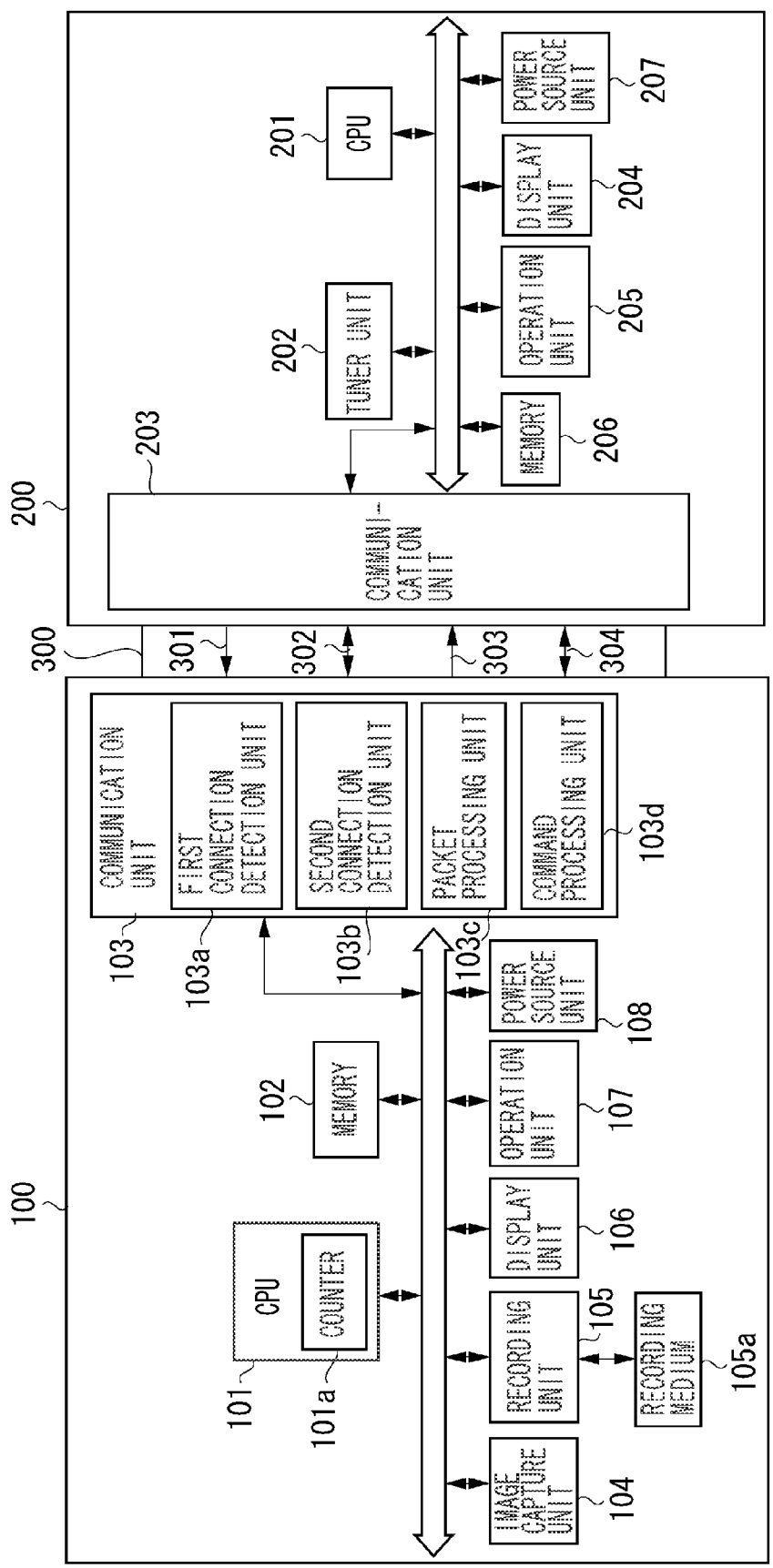
FIG. 2 is a block diagram illustrating the communication system according to an exemplary embodiment of the present invention.

A communication system according to an exemplary embodiment of the present invention includes, as illustrated in FIGS. 1 and 2, a communication apparatus 100, an external apparatus 200, and a connection cable 300. The communication apparatus 100 and the external apparatus 200 are connected via the connection cable 300.

The communication apparatus 100 is a video output apparatus that can transmit video data, audio data, and auxiliary data to the external apparatus 200 via the connection cable 300. The external apparatus 200 is a display apparatus that receives the video data from the communication apparatus 100 and displays the received video data on a display device.

Further, the external apparatus 200 includes a speaker that can output the audio data received from the communication apparatus 100. The communication apparatus 100 and the external apparatus 200 can perform bidirectional communications to transmit various control commands via the connection cable 300.

In the present exemplary embodiment, the communication apparatus 100, the external apparatus 200, and the connection cable 300 conform to the HDMI standard. Accordingly, the communication apparatus 100 is a source device that is functionally operable as an HDMI source in conformity with the HDMI standard. The external apparatus 200 is a sink device that is functionally operable as an HDMI sink in conformity with the HDMI standard.

In the present exemplary embodiment, the communication apparatus 100 and the external apparatus 200 conform to the Consumer Electronics Control (CEC) protocol defined by the HDMI standard. The bidirectional transmission of control commands is performed between the communication apparatus 100 and the external apparatus 200 in conformity with the CEC protocol. Hereinafter, the control commands that conform to the CEC protocol are referred to as "CEC commands."

In the present exemplary embodiment, a digital video camera can operate as an example of the communication apparatus 100. It is needless to say that the communication apparatus 100 is not limited to the digital video camera. Any other video output apparatus, such as a digital still camera, a recorder, or a digital versatile disc (DVD) player, can be employed as the communication apparatus 100 if it is functionally operable as an HDMI source.

In the present exemplary embodiment, a television receiver (hereinafter, referred to as "TV") can operate as an example of the external apparatus 200. It is needless to say that the external apparatus 200 is not limited to the TV. Any other display apparatus, such as a projector or a personal computer, can be employed as the external apparatus 200 if it is functionally operable as an HDMI sink.

In the following description, the communication apparatus 100 is referred to as a "video camera 100", the external apparatus 200 is referred to as a "TV 200", and the connection cable 300 is referred to as an "HDMI cable 300".

Next, a detailed configuration of the HDMI cable 300 is described with reference to FIG. 2.

The HDMI cable 300 includes a +5V power line, a Hot Plug Detect (HPD) line 301, and a Display Data Channel (DDC) line 302. The HDMI cable 300 further includes a Transition Minimized Differential Signaling (TMDS) line 303 and a CEC line 304.

The +5V power line is a power supply line via which the video camera 100 can supply a DC voltage of +5V to the TV 200.

The HPD line 301 is a transmission line via which the TV 200 can transmit an HPD signal of a high-voltage level (hereinafter, referred to as "H level") or an HPD signal of a low-voltage level (hereinafter, referred to as "L level") to the video camera 100.

The DDC line 302 is a transmission line via which the TV 200 can transmit its device information to the video camera 100.

The device information of the TV 200 is, for example, Extended Display Identification Data (EDID) or Enhanced EDID (E-EDID) of the TV 200. Each of the EDID and the E-EDID includes, as device information of the TV 200, information about the TV 200, such as identification information of the TV 200 and information about display performances of the TV 200.

For example, the EDID and the E-EDID include information about resolution, scanning frequency, aspect ratio, and color space, which are supported by the TV 200. The E-EDID is formed by enhancing the EDID, and contains more device information than the EDID does. For example, the E-EDID includes information about a format of video data and a format of audio data, which is supported by the TV 200. In the following description, both the EDID and the E-EDID are referred to as "EDID."

The TMDS line 303 is a transmission line via which the video camera 100 can transmit video data, audio data, and auxiliary data to the TV 200. The TMDS line 303 includes TMDS channel 0, TMDS channel 1, TMDS channel 2, and TMDS clock channel.

The CEC line 304 is a transmission line via which the video camera 100 and the TV 200 can perform bidirectional communications to transmit various CEC commands. The TV 200 can control the video camera 100 by transmitting a CEC command to be used to control the video camera 100, via the CEC line 304, to the video camera 100.

Next, an example configuration of the video camera 100 is described below with reference to FIG. 2.

The video camera 100 includes, as illustrated in FIG. 2, a central processing unit (CPU) 101, a memory 102, a communication unit 103, an image capture unit 104, a recording unit 105, a display unit 106, an operation unit 107, and a power source unit 108. Hereinafter, the video camera 100 is described in more detail.

The CPU 101 can control various operations to be performed by the video camera 100 according to a computer program stored in the memory 102. The CPU 101 can control the operations to be performed by the video camera 100 referring to the EDID of the TV 200. The CPU 101 analyzes data supplied from various components provided in the video camera 100 and controls the operations to be performed by the video camera 100.

Further, the CPU 101 controls the power source unit 108 to supply power to various components provided in the video camera 100 and also controls the power source unit 108 to stop power.

Further, the CPU 101 includes a counter 101a that can count a counter value that indicates the number of times of process performed by each component of the video camera 100.

The memory 102 is functionally operable as a work area for the CPU 101. Information stored in the memory 102 includes the EDID of the TV 200 and the identification information of TV 200. Further, the memory 102 stores settings about flag corresponding to operations performed by respective components, counter values of the counter 101a, and thresholds to be compared with the counter values.

Further, the memory 102 can store results of arithmetic operations and analyses performed by the CPU 101. The work area for the CPU 101 is not limited to the memory 102, and can be an external recording device such as a hard disk drive.

The communication unit 103 includes an HDMI terminal to which the HDMI cable 300 can be connected. The communication unit 103 can acquire the EDID of the TV 200 via the HDMI terminal and performs transmission/reception of CEC commands and transmission of video data, audio data, and auxiliary data. The communication unit 103 includes a first connection detection unit 103a, a second connection detection unit 103b, a packet processing unit 103c, and a command processing unit 103d.

The first connection detection unit 103a can receive an HPD signal transmitted from the TV 200 via the HPD line 301. In a case where the video camera 100 supplies the DC voltage of +5V to the TV 200 via the +5V power line, the TV 200 transmits an HPD signal of H level or an HPD signal of L level to the video camera 100 depending on a determination result as to whether the EDID can be transmitted to the video camera 100.

In a case where the DC voltage of +5V is supplied from the video camera 100 to the TV 200, if the TV 200 can transmit the EDID to the video camera 100, the TV 200 transmits the HPD signal of H level to the video camera 100 via the HPD line 301. Hence, when the first connection detection unit 103a has received the HPD signal of H level, the first connection detection unit 103a sends, to the CPU 101, a notification informing that the EDID of the TV 200 can be acquired from the TV 200.

Further, in a case where the DC voltage of +5V is not supplied from the video camera 100 to the TV 200, the TV 200 transmits an HPD signal of L level to the video camera 100 via the HPD line 301. Similarly, in a case where the TV 200 cannot transmit the EDID of the TV 200 to the video camera 100, the TV 200 transmits an HPD signal of L level to the video camera 100 via the HPD line 301.

For example, if any one of video settings, resolution settings, audio settings included in the EDID of the TV 200 is changed, the TV 200 rewrites the information defined by the EDID. In this case, the TV 200 transmits an HPD signal of L level to the video camera 100 via the HPD line 301 until completion of the rewriting of the EDID.

After the completion of the rewriting of the EDID, the TV 200 transmits the HPD signal having been changed from the L level to the H level to the video camera 100 via the HPD line 301. In a case where the HPD signal received from the HPD line 301 has been changed from the H level to the L level, the first connection detection unit 103a informs, to the CPU 101, a notification indicating that the HPD signal has been changed from the H level to the L level.

Similarly, in a case where the HPD signal has been changed from the L level to the H level, the first connection detection unit 103a informs, to the CPU 101, a notification indicating that the HPD signal has been changed from the L level to the H level. If the CPU 101 requests the received HPD signal, the first connection detection unit 103a supplies the HPD signal to the CPU 101.

In a case where the HPD signal supplied from the first connection detection unit 103a is an H-level signal, the communication unit 103 can acquire the EDID of the TV 200, via the DDC line 302, from the TV 200. In a case where the HPD signal supplied from the first connection detection unit 103a is an L-level signal, the communication unit 103 determines that the EDID of the TV 200 cannot be acquired via the DDC line 302.

To detect the presence of the TV 200, the second connection detection unit 103b can continuously detect whether the TMDS line 303 is connected to a terminal resistor on the TV 200 side. For example, information generally referred to as "Receiver Sense (hereinafter, referred to as RX sense)" is an example that can be used to detect whether the TMDS line 303 is connected to the terminal resistor on the TV 200.

An RX sense of H level indicates that the TMDS line 303 is connected to the terminal resistor on the TV 200. An RX sense of L level indicates that the TMDS line 303 is not connected to the terminal resistor on the TV 200. In a case where the TMDS line 303 is connected to the terminal resistor on the TV 200, the second connection detection unit 103b can detect the RX sense of H level. Further, in a case where the TMDS line 303 is not connected to the terminal resistor on the TV 200, the second connection detection unit 103b can detect the RX sense of L level.

The state where the TMDS line 303 is connected to the terminal resistor on the TV 200 is, for example, a state where the TV 200 is in an output state. In the context of the following disclosure of the present invention, the "output state" is a state where the TV 200 is in a power on state and video data received from the video camera 100 via the TMDS line 303 is selected as video data to be displayed on the TV 200.

Further, in a case where the TV 200 is in the output state, audio data received from the video camera 100 via the TMDS line 303 is selected as audio data to be output via a speaker unit of the TV 200. Therefore, in a case where the RX sense detected by the second connection detection unit 103b is an H-level signal, the CPU 101 determines that the TV 200 is in the output state.

The state where the TMDS line 303 is not connected the terminal resistor on the TV 200 is, for example, a state where the TV 200 is not in the output state, i.e., in a non-output state. In the context of the following disclosure of the present invention, the "non-output state" is a state where the TV 200 is not in the power on state or the video data received from the video camera 100 via the TMDS line 303 is not selected as video data to be displayed on the TV 200.

In a case where the video data received from the video camera 100 via the TMDS line 303 is not selected as video data to be displayed on the TV 200, the audio data received from the video camera 100 via the TMDS line 303 is not selected as audio data to be output from the speaker unit of the TV 200. Therefore, in a case where the RX sense detected by the second connection detection unit 103*b* is an L-level signal, the CPU 101 determines that the TV 200 is in the non-output state.

The second connection detection unit 103*b* supplies the detected RX sense to the CPU 101 if a request is received from the CPU 101. In accordance with the RX sense supplied from the second connection detection unit 103*b*, the CPU 101 determines whether the TV 200 can display video data output from the video camera 100, namely, determines whether the state of the TV 200 is in the output state.

The packet processing unit 103*c* can transmit video data, audio data, and auxiliary data to the TV 200 via the TMDS line 303.

The CPU 101 generates video data, audio data, and auxiliary data that correspond to an ability of display of the TV 200 and an ability of audio of the TV 200 included in the EDID obtained as a result of an analysis on the data acquired from the TV 200, and supplies the generated data to the packet processing unit 103*c*.

The CPU 101 controls the packet processing unit 103*c* to transmit the supplied video data, audio data, and auxiliary data to the TV 200 via the TMDS line 303.

In a case where the operation mode of the video camera 100 is an image capture mode, the communication unit 103 can transmit video data generated by the image capture unit 104 and audio data generated by a microphone unit (not illustrated) to the TV 200 via the TMDS line 303. In this case, auxiliary data generated by the CPU 101 can be transmitted together with the video data and the audio data to the TV 200 via the TMDS line 303.

In a case where the operation mode of the video camera 100 is a playback mode, the communication unit 103 can cause the recording unit 105 to reproduce video data and audio data from the recording medium 105*a* and can transmit the reproduced data to the TV 200 via the TMDS line 303. In this case, the auxiliary data generated by the CPU 101 can be transmitted together with the reproduced video data and audio data to the TV 200 via the TMDS line 303.

The command processing unit 103*d* can receive a CEC command transmitted from the TV 200 via the CEC line 304. The CEC command received from the TV 200 is supplied from the command processing unit 103*d* to the CPU 101. The CPU 101 can control the video camera 100 according to the CEC command received from the TV 200.

Further, the command processing unit 103*d* can also transmit the CEC command to be used to control the TV 200, via the CEC line 304, to the TV 200. The CEC command to be used to control the TV 200 can be generated by the CPU 101 and supplied from the CPU 101 to the command processing unit 103*d*.

In a case where a CEC command is transmitted from the command processing unit 103*d* to the TV 200 via the CEC line 304, if the TV 200 succeeds in receiving the CEC command transmitted from the video camera 100, the TV 200 transmits a response signal corresponding to the CEC command to the video camera 100.

The response signal is, for example, an acknowledgement (ACK) signal or a negative acknowledgement (NACK) signal. The ACK signal includes a signal that acknowledges the CEC command received from the video camera 100. The NACK signal includes a signal that does not acknowledge the CEC command received from the video camera 100. If the TV 200 can correctly receive the CEC command transmitted from the video camera 100, the TV 200 transmits the ACK signal to the video camera 100. If the TV 200 cannot correctly receive the CEC command transmitted from the video camera 100, the TV 200 transmits the NACK signal to the video camera 100. The command processing unit 103*d* can receive the ACK signal or the NACK signal via the CEC line 304.

In the case where the operation mode of the video camera 100 is the image capture mode, the image capture unit 104 captures an optical image of a subject and generates video data based on the optical image of the subject. The video data generated by the image capture unit 104 can be a moving image or a still image. The video data generated by the image capture unit 104 can be supplied from the image capture unit 104 to the packet processing unit 103*c*, the recording unit 105, and the display unit 106.

In a case where the reception of the EDID from the TV 200 was successful, the image capture unit 104 converts video data to be supplied from the image capture unit 104 to the packet processing unit 103*c* into video data suitable for the ability of display of the TV 200.

The video data supplied from the imaging unit 104 to the packet processing unit 103*c* can be transmitted via the TMDS line 303 to the TV 200. The video data supplied from the image capture unit 104 to the recording unit 105 can be stored in the recording medium 105*a*. The video data supplied from the image capture unit 104 to the display unit 106 can be displayed on the display unit 106.

In a case where the image capture unit 104 generates video data, a microphone unit (not illustrated) generates audio data. The audio data generated by the microphone unit is supplied from the microphone unit to the packet processing unit 103*c*, the recording unit 105, and the speaker unit (not illustrated).

In a case where the reception of the EDID from the TV 200 was successful, the microphone unit converts the audio data supplied from the microphone unit to the packet processing unit 103*c* into audio data suitable for the ability of audio of the TV 200. The audio data supplied from the microphone unit to the packet processing unit 103*c* is transmitted via the TMDS line 303 to the TV 200. The audio data supplied from the microphone unit to the recording unit 105 is stored in the recording medium 105*a*. The audio data supplied from the microphone unit to the display unit 106 is output to the speaker unit (not illustrated).

In the case where the operation mode of the video camera 100 is the playback mode, the image capture unit 104 stops the image capture operation and also stops the generation of video data based on the optical image of the subject.

In the case where the operation mode of the video camera 100 is the image capture mode, the recording unit 105 can store, in the recording medium 105*a*, the video data generated by the image capture unit 104 and the audio data generated by the microphone unit. The CPU 101 controls the recording of video data and audio data generated by the imaging unit 104 and the microphone unit into the recording medium 105*a* according to an instruction input by a user via the operation unit 107. Further, the CPU 101 can control the recording of video data and audio data generated by the image capture unit 104 and the microphone unit into the recording medium 105a according to a CEC command received from the TV 200.

In the case where the operation mode of the video camera 100 is the playback mode, the recording unit 105 can reproduce video data and audio data selected by a user from the recording medium 105a. The CPU 101 controls the selection of video data and audio data to be reproduced from the recording medium 105a according to an instruction input by a user via the operation unit 107. Further, the CPU 101 can control the selection of video data and audio data to be reproduced from the recording medium 105a according to a CEC command received from the TV 200.

The video data reproduced from the recording medium 105a by the recording unit 105 can be supplied from the recording unit 105 to the packet processing unit 103c and the display unit 106. In a case where the reception of the EDID from the TV 200 was successful, the CPU 101 converts the video data supplied from the recording unit 105 to the packet processing unit 103c into video data suitable for the ability of display of the TV 200 according to the received EDID.

The video data supplied from the recording unit 105 to the packet processing unit 103c can be transmitted via the TMDS line 303 to the TV 200. The video data supplied from the recording unit 105 to the display unit 106 can be displayed on the display unit 106. The audio data reproduced from the recording medium 105a by the recording unit 105 can be supplied from the recording unit 105 to the packet processing unit 103c and the speaker unit (not illustrated).

In a case where the reception of the EDID from the TV 200 was successful, the CPU 101 converts the audio data supplied from the recording unit 105 to the packet processing unit 103c into audio data suitable for the ability of audio of the TV 200 according to the EDID. The audio data supplied from the recording unit 105 to the packet processing unit 103c can be transmitted via the TMDS line 303 to the TV 200. The audio data supplied from the recording unit 105 to the speaker unit can be output from the speaker unit.

The recording medium 105a is, for example, a memory card or a hard disk drive. The recording medium 105a may be either a recording medium provided in the video camera 100 or a recording medium detachable from the video camera 100.

The display unit 106 can include a liquid crystal display (LCD) device or any other display device. In the case where the operation mode of the video camera 100 is the image capture mode, the display unit 106 displays video data generated by the image capture unit 104. In the case where the operation mode of the video camera 100 is the playback mode, the display unit 106 displays video data that can be reproduced from the recording medium 105a by the recording unit 105.

The operation unit 107 provides a user interface that enables users to operate the video camera 100. The operation unit 107 includes a plurality of buttons that can be pressed or manipulated to operate the video camera 100. The buttons provided on the operation unit 107 include switches and a touch panel. The CPU 101 can control the video camera 100 according to an instruction input by a user via the operation unit 107.

The operation unit 107 includes a power button, a mode change button, a start/stop button, a menu button, a plus (+) button, a minus (−) button, and a SET button.

The power source unit 108 can supply power to various components provided in the video camera 100 from a battery attached to the video camera 100 or from an AC power source. In the context of the present disclosure, a term "power off state" indicates a state where no power is supplied to a part or all of electric components incorporated in the video camera 100 from the power source unit 108. A term "power on state" indicates a state where the power is supplied to each component of the video camera 100 from the power source unit 108.

Next, an example configuration of the TV 200 is described below with reference to FIG. 2.

The TV 200 includes, as illustrated in FIG. 2, a CPU 201, a tuner unit 202, a communication unit 203, a display unit 204, an operation unit 205, a memory 206, and a power source unit 207.

The CPU 201 can control various operations to be performed by the TV 200 according to a computer program stored in the memory 206. Further, the CPU 201 can control the power source unit 207 to supply power to each component or stop the power supply operation.

The tuner unit 202 can receive a television broadcasting program of a television channel selected by a user. The operation unit 205 or a remote controller (not illustrated) can be operated to perform the selection of a television channel.

The communication unit 203 includes an HDMI terminal to which the HDMI cable 300 can be connected. The communication unit 203 can receive video data, audio data, and auxiliary data from the video camera 100 via the TMDS line 303. The video data received from the video camera 100 can be displayed on the display unit 204. The audio data received from the video camera 100 can be output from a speaker unit (not illustrated). The auxiliary data received from the video camera 100 can be supplied to the CPU 201. The CPU 201 can control the TV 200 according to the auxiliary data received from the video camera 100.

The HDMI terminal included in the communication unit 203 is not limited to only one. The TV 200 can include two or more HDMI terminals depending on functions to be realized, so that the TV 200 can communicate with source devices other than the video camera 100 via HDMI cables.

Therefore, the TV 200 can receive video data, audio data, and auxiliary data from any other source device connected via an HDMI cable. In this case, similar to the data received from the video camera 100, the video data received from the source device other than the video camera 100 can be displayed on the display unit 204. The audio data can be output from the speaker unit (not illustrated) and the auxiliary data can be supplied to the CPU 201.

The communication unit 203 can receive a CEC command transmitted from the video camera 100 via the CEC line 304. The CEC command received from the video camera 100 can be supplied from the communication unit 203 to the CPU 201. The CPU 201 can control the TV 200 according to the CEC command received from the video camera 100. The communication unit 203 can transmit a CEC command to be used to control the video camera 100, via the CEC line 304, to the video camera 100. The CEC command to be used to control the video camera 100 can be generated by the CPU 201 and supplied from the CPU 201 to the communication unit 203.

The communication unit 203 determines whether the DC voltage of +5V is supplied from the video camera 100 to the TV 200 via the +5V power line. The communication unit 203 transmits an HPD signal of H level or an HPD signal of L level depending on a determination result, via the HPD line 301, the video camera 100. In a case where the DC voltage of +5V is not supplied from the video camera 100 to the communication unit 203 via the +5V power line, the CPU 201 controls the communication unit 203 to transmit the HPD signal of L level to the video camera 100 via the HPD line 301.

In a case where the DC voltage of +5V is supplied from the video camera 100 to the communication unit 203 via the +5V power line, the CPU 201 determines whether the EDID of the TV 200 stored in the memory 206 can be transmitted to the video camera 100 via the DDC line 302.

In a case where information included in the EDID stored in the memory 206 is not changed, or in a case where the rewriting of the EDID is completed, the CPU 201 determines that the EDID of the TV 200 can be transmitted to the video camera 100 via the DDC line 302. In this case, the CPU 201 controls the communication unit 203 to transmit the HPD signal of H level to the video camera 100 via the HPD line 301.

In a case where the information included in the EDID is rewritten according to a setting change of the TV 200, the CPU 201 determines that the EDID of the TV 200 cannot be transmitted to the video camera 100 via the DDC line 302. In this case, the CPU 201 controls the communication unit 203 to transmit the HPD signal of L level to the video camera 100 via the HPD line 301.

Further, the communication unit 203 can transmit the EDID of the TV 200 to the video camera 100 via the DDC line 302.

The display unit 204 can include a liquid crystal display device or any other display device. The display unit 204 can display video data supplied from at least one the tuner unit 202 and the communication unit 203. In a case where video data received from the video camera 100 is supplied from the communication unit 203, the display unit 204 displays the video data received from the video camera 100.

The operation unit 205 provides a user interface that enables users to operate the TV 200. The operation unit 205 includes a plurality of buttons that can be pressed or manipulated to operate the TV 200. The CPU 201 can control the TV 200 according to an instruction input by a user via the operation unit 205.

The buttons provided on the operation unit 205 include switches and a touch panel. The operation unit 205 includes a power button, a channel selection button, an external input button, a menu button, a plus (+) button, a minus (−) button, and a SET button, for operations of the TV 200.

The power button is operable to instruct the CPU 201 to bring the TV 200 into a power on state or into a power off state. In this case, the power on state is a state where the CPU 201 controls the power source unit 207 to supply power to all components of the TV 200. The power off state is a state where the CPU 201 controls the power source unit 108 to stop the operation for supplying power to a part or all of electric components provided in the TV 200.

The channel selection button is operable to select a television channel to be received by the tuner unit 202.

The external input button is operable to select video data included in the television broadcasting program received by the tuner unit 202 or video data received from the video camera 100 via the HDMI cable 300 and then display the selected video data on the display unit 204.

The power source unit 207 is operable to supply power from the AC power source to the TV 200.

Next, video output process that can be performed by the video camera 100 according to the present exemplary embodiment is described below with reference to FIG. 3.

Figure 3:
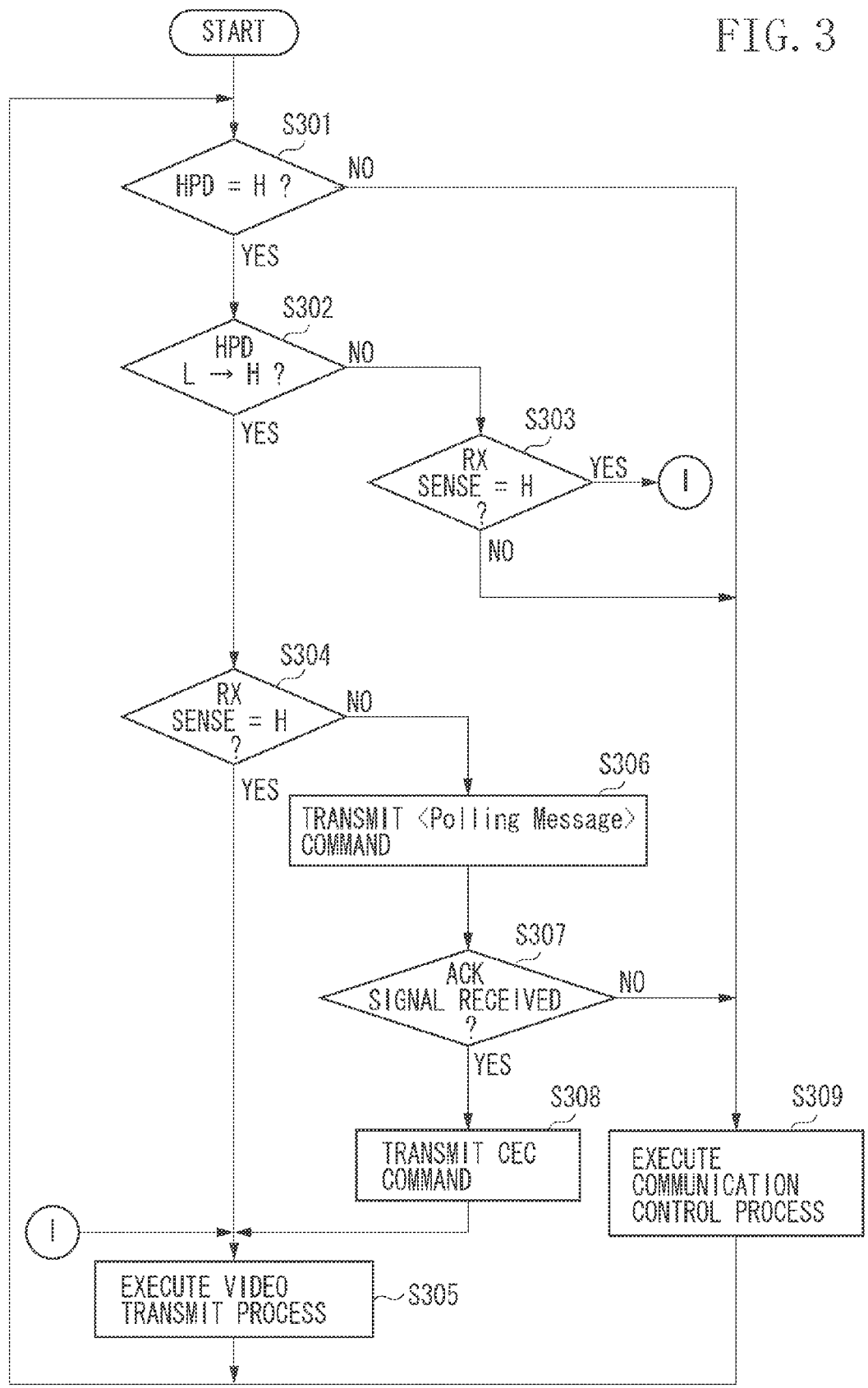
FIG. 3 is a flowchart illustrating image output control processing according to an exemplary embodiment of the present invention.

FIG. 3 is a flowchart illustrating an example of the video output process that can be performed by the video camera 100 according to the present exemplary embodiment.

Cooperative process according to the present exemplary embodiment is process for controlling the video camera 100 or the TV 200 in response to insertion of the HDMI cable 300, which is connected to the HDMI terminal of the video camera 100 at one end and connected to the TV 200 at the other end.

Further, a computer program that causes the video camera 100 to perform the video output process illustrated in FIG. 3 can be realized by an operating system (OS) running on a computer.

The video output process is, for example, performed when an HPD signal of H level is detected by the first connection detection unit 103a, in which video data to be displayed on the TV 200 is output from the video camera 100 to the TV 200.

To realize the video output process described with reference to FIG. 3, the CPU 101 executes the computer program stored in the memory 102 in a case where the video camera 100 is in the power on state.

After the HDMI terminal of the video camera 100 and the HDMI terminal of the TV 200 are connected via the HDMI cable 300, in step S301, the CPU 101 requests the first connection detection unit 103a to send an HPD signal received from the TV 200. The CPU 101 determines whether the EDID of the TV 200 can be acquired from the TV 200 via the DDC line 302 according to the HPD signal supplied from the first connection detection unit 103a.

In a case where the HPD signal supplied from the first connection detection unit 103a is an H-level signal (YES in step S301), the CPU 101 determines that the EDID can be acquired via the DDC line 302. In this case, the process of the flowchart proceeds from step S301 to step S302. In a case where the HPD signal supplied from the first connection detection unit 103a is an L-level signal (NO in step S301), the CPU 101 determines that the EDID cannot be acquired via the DDC line 302. In this case, the process of the flowchart proceeds from step S301 to step S309.

In a case where it is determined that the supplied HPD signal is an H-level signal (YES in step S301), the CPU 101 is required to confirm whether video transmit process in step S305 has been already executed. To confirm the execution of the video transmit process in step S305, the CPU 101 can determine whether the supplied HPD signal has been changed to the H level from any state. Hence, in step S302, the CPU 101 determines whether a notification indicating that the HPD signal has been changed from the L level to the H level is received from the first connection detection unit 103a.

The state where the HPD signal is changed from the L level to the H level is, for example, a momentary state immediately after the DC voltage of +5V is supplied from the video camera 100 to the TV 200 or a momentary state where the TV 200 has accomplished rewriting of the EDID of the TV 200.

If the CPU 101 determines that the notification indicating that the HPD signal has been changed from the L level to the H level is received from the first connection detection unit 103a (YES in step S302), the CPU 101 can determine that the video transmit process in step S305 is not executed yet. To this end, the communication unit 103 acquires the EDID from the TV 200 via the DDC line 302 and supplies the acquired EDID of the TV 200 to the CPU 101. The CPU 101 analyzes the EDID supplied from the communication unit 103 and stores an analysis result in the memory 102.

If the CPU 101 determines that the notification indicating that the HPD signal has been changed from the L level to the H level is received from the first connection detection unit 103a (YES in step S302), the process of the flowchart proceeds from step S302 to step S304.

The state where the HPD signal is not changed from the L level to the H level is, for example, a state where the DC voltage of +5V is continuously supplied from the video camera 100 to the TV 200 or a state where the rewriting of the EDID is not performed by the TV 200.

If the CPU 101 determines that the notification indicating that the HPD signal has been changed from the L level to the H level is not received from the first connection detection unit 103a (NO in step S302), the process of the flowchart proceeds from step S302 to step S303.

If it is determined that the notification indicating that the HPD signal has been changed from the L level to the H level is not received from the first connection detection unit 103a (NO in step S302), the CPU 101 determines that the video transmit process in step S305 has been already executed.

In this case, the memory 102 stores the EDID already acquired from the TV 200. It can be regarded that the video camera 100 has already transmitted video data corresponding to a video format defined by the EDID stored in the memory 102 to the TV 200.

However, if the TV 200 is changed from the output state to the non-output state before the video camera 100 completes the video transmit process in step S305, the video data received from the video camera 100 cannot be displayed on the TV 200.

For example, if the TV 200 is changed to the power off state or in a case where a user is viewing video data supplied from a device other than the video camera 100 on the TV 200, the video camera 100 may uselessly consume power. Therefore, the CPU 101 is required to determine whether the TV 200 is in the output state even when the video camera 100 has already transmitted video data to the TV 200.

Hence, in step S303, the CPU 101 requests the second connection detection unit 103b to send the RX sense of the TV 200 and determines whether the TV 200 is in the output state based on the RX sense supplied from the second connection detection unit 103b. The CPU 101 stores the RX sense supplied from the second connection detection unit 103b in the memory 102.

In a case where the RX sense supplied from the second connection detection unit 103b is an H-level signal, the CPU 101 determines that the TV 200 is in the output state. If the CPU 101 determines that the TV 200 is in the output state (YES in step S303), the process of the flowchart proceeds from step S303 to step S305.

In a case where the RX sense supplied from the second connection detection unit 103b is an L-level signal, the CPU 101 determines that the TV 200 is in the non-output state. If the CPU 101 determines that the TV 200 is in the non-output state (NO in step S303), the process of the flowchart proceeds from step S303 to step S309.

If it is determined that the notification indicating that the HPD signal has been changed from the L level to the H level is received from the first connection detection unit 103a (YES in step S302), the CPU 101 changes the video data stored in the recording medium 105a to have a video format defined by the acquired EDID.

In this case, even if the video camera 100 transmits the changed video data having the video format defined by the EDID to the TV 200, the video data received from the video camera 100 cannot be displayed in a case where the TV 200 is not in the output state.

Therefore, not only a user cannot view the video data transmitted from the video camera 100 on the TV 200 but also the video camera 100 uselessly consumes power. Hence, the CPU 101 is required to determine whether the TV 200 is in the output state before transmitting the video data having been changed to have the video format defined by the EDID to the TV 200.

Hence, in step S304, the CPU 101 requests the second connection detection unit 103b to send the RX sense in the same manner as the process in step S303. The CPU 101 determines whether the TV 200 is in the output state based on the RX sense supplied from the second connection detection unit 103b. The CPU 101 stores the RX sense supplied from the second connection detection unit 103b in the memory 102.

In a case where the RX sense supplied from the second connection detection unit 103b is an H-level signal, the CPU 101 determines that the TV 200 is in the output state. If the CPU 101 determines that the TV 200 is in the output state (YES in step S304), the process of the flowchart proceeds from step S304 to step S305.

In a case where RX sense supplied from the second connection detection unit 103b is an L-level signal, the CPU 101 determines that the TV 200 is in the non-output state. If the CPU 101 determines that the TV 200 is in the non-output state (NO in step S304), the process of the flowchart proceeds from step S304 to step S306.

In a case where the TV 200 is in the output state (YES in step S303), the video transmit process for transmitting video data from the video camera 100 to the TV 200 is already started. Therefore, to continuously execute the video transmit process, the CPU 101 executes the video transmit process in step S305.

In a case where the TV 200 is in the output state (YES in step S304), a user can view the video data transmitted from the video camera 100 on the TV 200. Hence, to transmit the video data having been changed to have the video format defined by the EDID to the TV 200, the CPU 101 executes the video transmit process in step S305.

In step S305, the CPU 101 performs the video transmit process. The video transmit process is, for example, format change process and transmission process.

The format change process is process for changing data to be transmitted to the TV 200 to data according to the format of video data and the format of audio data included in the EDID of the TV 200. In a case where the format change process is already completed, the format change process can be omitted.

The transmission process includes process for transmitting the changed video data according to the format of video data included in the EDID of the TV 200 to the TV 200 via the TMDS line 303. Further The transmission process includes process for transmitting the changed audio data according to the format of audio data included in the EDID of the TV 200 to the TV 200 via the TMDS line 303. The packet processing unit 103c performs the transmission process. After the CPU 101 accomplishes the video transmit process, the process of the flowchart returns from step S305 to step S301.

In a case where the TV 200 is in the non-output state (NO in step S304), the CPU 101 is already notified in step S302 that the HPD signal has been changed from the L level to the H level. Therefore, a user may be viewing the video data transmitted from the video camera 100 on the TV 200. In such a case, it is difficult to regard that the user has performed an operation for bringing the TV 200 into the power off state or an operation for switching the output of the TV 200 to video data supplied from the tuner unit 202 regardless of the change of the HPD signal from the L level to the H level.

Further, it is necessary to refer to a CEC command to bring the TV 200 into the output state to enable the user to view the video data transmitted from the video camera 100 on the TV 200 even in a case where the TV 200 is in the non-output state (NO in step S304). To this end, the CPU 101 is required to determine whether the TV 200 can be controlled based on the CEC command, to change the state of the TV 200 from the non-output state to the output state based on the CEC command.

Hence, in step S306, the CPU 101 generates a control confirmation command to confirm whether the TV 200 can be controlled based on the CEC command. In the present exemplary embodiment, a <Polling Message> command regulated by the CEC command is described as an example of the control confirmation command.

The CPU 101 outputs the generated <Polling Message> command to the command processing unit 103d. The CPU 101 controls the command processing unit 103d to transmit the <Polling Message> command to the TV 200 via the CEC line 304. After the command processing unit 103d has completed the process for transmitting the <Polling Message> command to the TV 200 via the CEC line 304, the process of the flowchart proceeds from step S306 to step S307. In the present exemplary embodiment, the <Polling Message> command is a CEC command regulated by the CEC protocol.

To determine whether the TV 200 can be controlled based on the CEC command, the CPU 101 is required to determine whether a signal returned in response to the <Polling Message> command is the ACK signal or the NACK signal.

Hence, in step S307, the CPU 101 determines whether the command processing unit 103d has received the ACK signal via the CEC line 304. If it is determined that the command processing unit 103d has received the ACK signal via the CEC line 304, the CPU 101 determines that the TV 200 can be controlled based on the CEC command.

If it is determined that the command processing unit 103d does not receive the ACK signal, namely, when the command processing unit 103d has received the NACK signal, the CPU 101 determines that the TV 200 cannot be controlled based on the CEC command. If the CPU 101 determines that the command processing unit 103d has received the ACK signal (YES in step S307), the process of the flowchart proceeds from step S307 to step S308. If the CPU 101 determines that the command processing unit 103d has not received the NACK signal (NO in step S307), the process the flowchart proceeds from step S307 to step S309. If the CPU 101 determines that the command processing unit 103d has received the NACK signal (NO in step S307), the process the flowchart proceeds from step S307 to step S309.

If it is determined that the command processing unit 103d has received the ACK signal (YES in step S307), the TV 200 can be controlled based on the CEC command. Hence, in step S308, the CPU 101 generates a CEC command to change the state of the TV 200 from the non-output state to the output state and outputs the generated CEC command to the command processing unit 103d.

The CPU 101 controls the command processing unit 103d to transmit the CEC command output from the CPU 101 to the TV 200 via the CEC line 304. After the command processing unit 103d has completed the process for transmitting the CEC command to the TV 200 via the CEC line 304, the process of the flowchart proceeds from step S308 to step S305.

The CEC command generated by the CPU 101 to change the state of the TV 200 from the non-output state to the output state is, for example, an <Image View On> command or an <Active Source> command regulated by the CEC. The <Image View On> command is a CEC command that instructs changing the state of the TV 200 into the power on state. The <Active Source> command is a CEC command that instructs switching the video data displayed by the TV 200 to video data received from the video camera 100 via the TMDS line 303.

The CEC command generated by the CPU 101 in step S308 and transmitted by the command processing unit 103d to the TV 200 is not limited to the above-described CEC command and can be any other command capable of changing the state of the TV 200 from the non-output state to the output state, such as a Vendor Command.

Further, in a case where the command processing unit 103d has received the ACK signal (YES in step S307), if the command processing unit 103d receives a CEC command from the TV 200, the CPU 101 can control the entire operation of the video camera 100 based on the CEC command received from the command processing unit 103d.

Therefore, if it is determined that the command processing unit 103d has received the ACK signal (YES in step S307), it is useful that the CPU 101 determines whether the command processing unit 103d has received the command indicating that the state of the TV 200 has changed from the non-output state to the output state from the TV 200, for a predetermined time, before performing the process in step S308.

In such a case, if the CPU 101 determines that the command processing unit 103d has received the command indicating that the state of the TV 200 has changed from the non-output state to the output state from the TV 200 before the predetermined time has elapsed, the CPU 101 can determine that the TV 200 is in the output state. Therefore, the CPU 101 can perform the process in step S305 while skipping the process in step S308 and can control the packet processing unit 103c to transmit video data to the TV 200.

If the CPU 101 determines that the command processing unit 103d has not received the command indicating that the state of the TV 200 has changed from the non-output state to the output state from the TV 200 before the predetermined time has elapsed, the CPU 101 performs the process in step S308. The command indicating that the state of the TV 200 has changed from the non-output state to the output state, received from the TV 200, can be a CEC command or can be a Vendor Command.

In a case where the HPD signal supplied from the first connection detection unit 103a is an L-level signal (NO in step S301), the video camera 100 cannot acquire the EDID from the TV 200 via the DDC line 302. In this case, the video camera 100 cannot change the video data stored in the recording medium 105a into the video format defined by the EDID acquired from the TV 200. Therefore, it is necessary to prevent the video data from being transmitted to the TV 200 via the TMDS line 303.

In a case where it is determined that the TV 200 is in the non-output state (NO in step S303), the CPU 101 is not notified that the HPD signal has been changed from the L level to the H level in step S302. Therefore, there is the possibility that the TV 200 has been brought into the non-output state by an operation made by the user to bring the TV 200 into the power off state or an operation for the video data and audio data of a broadcasting program.

In this case, the video camera 100 cannot change the state of the TV 200 from the non-output state to the output state against the operation made by the user. Therefore, it is necessary to prevent the video data from being transmitted to the TV 200 via the TMDS line 303.

In a case where the CPU 101 determines that the ACK signal is not received (NO in step S307), the CPU 101 determines that the TV 200 cannot be controlled based on the CEC command. In this case, the video camera 100 does not transmit a CEC command that instructs changing the TV 200 to the output state to the TV 200 via the CEC line 304.

Therefore, until a user performs an operation to bring the TV 200 into the output state, the TV 200 does not display any video data transmitted from the packet processing unit 103c of the video camera 100 via the TMDS line 303. Therefore, it is necessary to prevent the video data from being transmitted to the TV 200 via the TMDS line 303.

In the above-described case, if the packet processing unit 103*c* continues the process for transmitting video data to the TV 200 via the TMDS line 303, the packet processing unit 103*c* uselessly consumes power for the video transmit process (i.e., process for transmitting the video data to the TV 200).

Hence, in step S309, to prevent the packet processing unit 103*c* from transmitting the video data, the CPU 101 performs communication control process for controlling power supply to the packet processing unit 103*c* by controlling the power source unit 108. After the communication control process by the CPU 101 is completed, the operational state of the packet processing unit 103*c* changes from an ordinary state to a low power consumption state.

In the process in step S309, the CPU 101 can first control the packet processing unit 103*c* so as to stop transmitting video data and then control the power source unit 108 to bring the packet processing unit 103*c* into the low power consumption state. Further, in the process in step S309, the CPU 101 can first control the recording unit 105 to stop reproducing video data from the recording medium 105*a* and then control the power source unit 108 to bring the packet processing unit 103*c* into the low power consumption state.

The ordinary state of the packet processing unit 103*c* is a state where the CPU 101 controls the power source unit 108 to supply power for transmitting video data, audio data, and auxiliary data from the video camera 100 to the TV 200 to the packet processing unit 103*c*.

Further, the low power consumption state of the packet processing unit 103*c* is a state where the CPU 101 does not control the power source unit 108 to supply power for transmitting video data, audio data, and auxiliary data from the video camera 100 to the TV 200 to the packet processing unit 103*c*.

In a case where the state of the packet processing unit 103*c* changes from the ordinary state to the low power consumption state, the packet processing unit 103*c* cannot transmit video data, audio data, and auxiliary data to the TV 200 via the TMDS line 303.

Meanwhile, to detect the HPD signal and the RX sense (i.e., information usable to confirm the presence of the TV 200) transmitted from the TV 200, the CPU 101 controls the power source unit 108 to continuously supply power to the first connection detection unit 103*a* and the second connection detection unit 103*b*.

Further, the CPU 101 controls the power source unit 108 to continuously supply power to the first connection detection unit 103*a* so that the DC voltage of +5V can be continuously supplied from the communication unit 103 to the TV 200.

Moreover, the CPU 101 controls the power source unit 108 to continuously supply power to the first connection detection unit 103*a* so that the command processing unit 103*d* can receive any CEC command from the TV 200 via the CEC line 304. After the communication control process by the CPU 101 is accomplished, the process of the flowchart returns from step S309 to step S301.

For example, in step S309, the TV 200 may be controllable using a CEC command in a case where the packet processing unit 103*c* is in the low power consumption state. In such a case, if the command processing unit 103*d* receives a command that instructs transmitting video data to the video camera 100 from the TV 200, the CPU 101 controls the packet processing unit 103*c* to change the state of the packet processing unit 103*c* from the low power consumption state to the ordinary state.

Subsequently, it is useful to control the packet processing unit 103*c* to transmit the video data to the TV 200 by further performing the process in step S305. In this case, the CPU 101 can determine whether the TV 200 is in the output state with reference to any command other than the HPD signal or the Rx sense, which can be transmitted from the TV 200 to the command processing unit 103*d*.

Further, in step S309, if the TV 200 can be controlled based on the CEC command in the case where the packet processing unit 103*c* is in the low power consumption state, the CPU 101 controls the packet processing unit 103*c* to change the state of the packet processing unit 103*c* from the low power consumption state to the ordinary state in response to a command indicating that the TV 200 is changed from the non-output state to the output state, which can be transmitted from the TV 200 to the command processing unit 103*d* of the video camera 100.

Subsequently, it is useful to control the packet processing unit 103*c* to transmit the video data to the TV 200 by further performing the process in step S305. In this case, the CPU 101 can determine whether the TV 200 is in the output state with reference to any command other than the HPD signal or the Rx sense, which can be transmitted from the TV 200 to the command processing unit 103*d*.

Further, in step S309, for example, if the TV 200 cannot be controlled based on the CEC command, the CPU 101 can bring the packet processing unit 103*c* into the low power consumption state and control the command processing unit 103*d* to stop the CEC command transmission and reception operation and further stop the operation for supplying power to the command processing unit 103*d*.

In this case, the CPU 101 controls the power source unit 108 to continuously supply power to the first connection detection unit 103*a* and the second connection detection unit 103*b* to determine whether the TV 200 is brought into the output state according to the HPD signal and the RX sense.

Further, in this case, the CPU 101 controls the power source unit 108 to continuously supply power to the communication unit 103 so that the DC voltage of +5V can be continuously supplied from the communication unit 103 to the TV 200.

If a state of the TV 200 having changed into the output state is detected based on the HPD signal and the RX sense in a state where the operation for supplying power to the command processing unit 103*d* is stopped, the CPU 101 can control the power source unit 108 to restart power supply to the command processing unit 103*d*.

As described above, in the present exemplary embodiment, if the HPD signal supplied from the first connection detection unit 103*a* is an L-level signal (NO in step S301), the video camera 100 stops the operation for supplying power to the packet processing unit 103*c*. Therefore, the video camera 100 cannot transmit video data having been changed into a video format displayable on the TV 200 to the TV 200. Thus, the present exemplary embodiment can realize the control for preventing video data from being uselessly transmitted.

In this case, the video camera 100 controls the packet processing unit 103*c* to stop video data transmission process. Therefore, the burden placed on the video camera 100, which performs the video transmit process, can be effectively reduced. The video camera 100 can prevent the packet processing unit 103*c* from excessively consuming power. Accordingly, the present embodiment can reduce the total amount of power consumed by the video camera 100.

Further, if it is determined that the TV 200 is in the non-output state based on the RX sense of the TV 200 supplied from the second connection detection unit 103*b* (NO in step S303), the video camera 100 stops the operation for supplying power to the packet processing unit 103c.

Therefore, the present exemplary embodiment can prevent the video camera 100 from performing the video data transmission process uselessly if the state of the TV 200 is changed into the power off state by an operation of a user or in a case where the TV 200 is presently outputting video data and audio data supplied from any other device. As a result, the present embodiment can reduce the total amount of power consumed by the video camera 100.

If the ACK signal is not returned from the TV 200 even in a case where the control confirmation command is transmitted to the TV 200 (NO in step S307), the video camera 100 stops the operation for supplying power to the packet processing unit 103c.

Therefore, the present exemplary embodiment can prevent the video camera 100 from performing the video data transmission process uselessly if it is determined that the video camera 100 cannot use the CEC command to control the TV 200 when the TV 200 is in the non-output state. As a result, the present embodiment can reduce the total amount of power consumed by the video camera 100.

If the ACK signal is returned from the TV 200 in response to the control confirmation command (YES in step S307), the video camera 100 transmits a CEC command that instruct changing the state of the TV 200 into the output state to the TV 200. Therefore, if the TV 200 is controllable using the CEC command even in a case where the state of the TV 200 is in the non-output state, the video camera 100 controls the packet processing unit 103c to transmit video data to the TV 200. Therefore, even in a case where the TV 200 is in the non-output state, the video camera 100 can change the state of the TV 200 into the output state and cause the TV 200 to display video data transmitted from the video camera 100.

As described above, the video camera 100 according to the present exemplary embodiment can control the video data transmission processing according to the connection state between the video camera 100 and the TV 200 or according to the operational state of the TV 200. Therefore, the video transmit process to be performed by the video camera 100 can be efficiently reduced according to the state of the TV 200. As a result, the present exemplary embodiment can reduce the amount of power consumed by the video camera 100.

The control confirmation command usable to confirm whether the TV 200 can be controlled based on a command is not limited to the <Polling Message> command and can be any other command. Further, in step S307, to determine whether the TV 200 can be controlled based on the CEC command, the CPU 101 has determined whether the command processing unit 103d has received the ACK signal or has received the NACK signal.

However, to perform the above-described determination, it is useful that the CPU 101 repeats the process for transmitting the <Polling Message> command to the TV 200 a plurality of times and determines whether the command processing unit 103d has received the ACK signal a predetermined number of times. For example, the predetermined number of times is equal to or greater than 1.

The counter 101a counts the number of times of the ACK signal having been received. The CPU 101 determines whether the counted number of times has reached a threshold to determine whether the command processing unit 103d has received the ACK signal the predetermined number of times.

In this case, the CPU 101 can determine whether the TV 200 can be controlled based on the CEC command in a case where the TV 200 fails in transmission of a response signal corresponding to the <Polling Message> command or in a case where the communication with the TV 200 via the CEC line 304 is temporarily interrupted.

Further, the above-described video transmit control process can be executed by the CPU 101 in response to an operation of a user performed on the video camera 100 in a state where the HDMI terminal of the video camera 100 and the HDMI terminal of the TV 200 are connected via the HDMI cable 300. In this case, the operation of the user performed on the video camera 100 includes, for example, pressing a reproduction button provided on the operation unit 107 to instruct reproduction of video data from the recording medium 105a.

In the present exemplary embodiment, the communication apparatus 100 has been described as an example source device operable in conformity with the HDMI standard and the external apparatus 200 has been described as an example sink device operable in conformity with the HDMI standard. However, any other device is employable if it can perform video transmit control process comparable to that described in the present exemplary embodiment.

Further, the connection cable 300 has been described as an example HDMI cable operable in conformity with the HDMI standard. However, a USB cable or an IEEE1394 cable can be also used. Further, the connection cable 300 can include a cable compatible with Digital Interactive Interface for Video and Audio (DiiVA).

The communication apparatus according to an exemplary embodiment of the present invention is not limited to the communication apparatus 100 and can be, for example, realized by a system including a plurality of devices.

Further, a computer program can be used to perform processing for realizing functions of the above-described exemplary embodiment. In this case, a computer can read the computer program from a computer-readable storage medium and execute the read program. The above-described computer program can be supplied to an apparatus or a system, and a computer provided in the apparatus or the system can execute the supplied program. The computer-readable storage medium is, for example, a hard disk drive, an optical disk, a compact disc-read only memory (CD-ROM), a CD-recordable (CD-R), a memory card, or a ROM. Further, the computer program can be supplied from an external apparatus to a computer via a communication interface and can be executed by the computer.

While the present invention has been described with reference to exemplary embodiments, it is to be understood that the present invention is not limited to the disclosed exemplary embodiments. The scope of the following claims is to be accorded the broadest interpretation so as to encompass all modifications, equivalent structures, and functions.

What is claimed is:

1. A communication apparatus comprising:
an acquiring unit that acquires predetermined information from a display device if the display device is in a first state, wherein the first state is a state that the display device allows the communication apparatus to acquire the predetermined information;
a first transmission unit that transmits data generated based on the predetermined information to the display device via a line;
a first detecting unit that detects, using a Hot Plug Detect (HPD) signal, whether the display device is in a second state or the first state, wherein the second state is different from the first state;
a second detecting unit that detects whether the line is connected to a terminal resistor of the display device;

a second transmission unit that transmits a command to the display device, wherein the command is used for changing a state of the display device to a power on state; and a control unit that causes the second transmission unit to transmit the command to the display device, after the second detecting unit detects that the line is not connected to the terminal resistor and the first detecting unit detects that the display device is in the first state, wherein the control unit causes the first transmission unit to transmits data generated based on the predetermined information to the display device via the line, after the command is transmitted to the display device, the second detecting unit detects that the line is connected to the terminal resistor, and the first detecting unit detects that the display device is in the first state, and wherein the predetermined information includes Extended Display Identification Data (EDID) or Enhanced EDID.

2. The communication apparatus according to claim 1, wherein the predetermined information includes information indicating an ability of the display device.

3. The communication apparatus according to claim 1, wherein the first transmission unit stops transmitting data generated based on the predetermined information, after the first detecting unit detects that the display device is in the second state.

4. The communication apparatus according to claim 1, wherein the control unit changes a state of the communication apparatus to a low power consumption state after the first detecting unit detects that the display device is in the second state.

5. The communication apparatus according to claim 1, wherein the first transmission unit stops transmitting data generated based on the predetermined information, after the second detecting unit detects that the line is not connected to the terminal resistor.

6. The communication apparatus according to claim 1, wherein the control unit changes a state of the communication apparatus to a low power consumption state after the second detecting unit detects that the line is not connected to the terminal resistor.

7. The communication apparatus according to claim 1, wherein the communication apparatus includes at least one of a camera, a recorder, and a player.

8. The communication apparatus according to claim 1, further comprising an image capture unit that generates data based on an optical image.

9. The communication apparatus according to claim 1, wherein transmitting data generated based on the predetermined information is controlled by the control unit based on whether the line is connected to the terminal resistor, after the first detecting unit detects that the display device is in the first state.

10. A method for a communication apparatus, the method comprising:
   acquiring predetermined information from a display device if the display device is in a first state, wherein the first state is a state that the display device allows the communication apparatus to acquire the predetermined information;
   detecting, using a Hot Plug Detect (HPD) signal, whether the display device is in a second state or the first state, wherein the second state is different from the first state;
   detecting whether a line is connected to a terminal resistor of the display device, wherein the line is used for transmitting data generated based on the predetermined information to the display device;
   transmitting a command to the display device, after detecting that the line is not connected to the terminal resistor and detecting that the display device is in the first state, wherein the command is used for changing a state of the display device to a power on state; and
   transmitting data generated based on the predetermined information to the display device via the line, after transmitting the command to the display device, detecting that the line is connected to the terminal resistor, and detecting that the display device is in the first state,
   wherein the predetermined information includes Extended Display Identification Data (EDID) or Enhanced EDID.

11. The method according to claim 10, wherein the predetermined information includes information indicating an ability of the display device.

12. The method according to claim 10, wherein transmitting data generated based on the predetermined information is stopped, after detecting that the display device is in the second state.

13. The method according to claim 10, wherein a state of the communication apparatus is changed to a low power consumption state after detecting that the display device is in the second state.

14. The method according to claim 10, wherein transmitting data generated based on the predetermined information is stopped, after detecting that the line is not connected to the terminal resistor.

15. The method according to claim 10, wherein a state of the communication apparatus is changed to a low power consumption state after detecting that the line is not connected to the terminal resistor.

16. The method according to claim 10, wherein the communication apparatus includes at least one of a camera, a recorder, and a player.

17. The method according to claim 10, wherein the communication apparatus includes an image capture unit that generates data based on an optical image.

18. The method according to claim 10, wherein transmitting data generated based on the predetermined information is controlled based on whether the line is connected to the terminal resistor, after the first detecting unit detects that the display device is in the first state.

19. A non-transitory computer-readable storage medium that stores a program for causing a computer to perform a method for a communication apparatus, the method comprising:
   acquiring predetermined information from a display device if the display device is in a first state, wherein the first state is a state that the display device allows the communication apparatus to acquire the predetermined information;
   detecting, using a Hot Plug Detect (HPD) signal, whether the display device is in a second state or the first state, wherein the second state is different from the first state;
   detecting whether a line is connected to a terminal resistor of the display device, wherein the line is used for transmitting data generated based on the predetermined information to the display device;
   transmitting a command to the display device, after detecting that the line is not connected to the terminal resistor and detecting that the display device is in the first state, wherein the command is used for changing a state of the display device to a power on state; and
   transmitting data generated based on the predetermined information to the display device via the line, after transmitting the command to the display device, detecting that the line is connected to the terminal resistor, and detecting that the display device is in the first state,
wherein the predetermined information includes Extended Display Identification Data (EDID) or Enhanced EDID.

* * * * *